United States Patent
Fujii et al.

(10) Patent No.: US 6,296,731 B1
(45) Date of Patent: *Oct. 2, 2001

(54) METHOD FOR PRODUCING A DECORATIVE SHEET AND APPARATUS FOR PRODUCING THE SAME

(75) Inventors: Atsushi Fujii; Tohru Yukumoto, both of Himeji (JP)

(73) Assignee: Idemitsu Petrochemical Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/949,656

(22) Filed: Oct. 14, 1997

(30) Foreign Application Priority Data

Oct. 14, 1996 (JP) .................................. 8-270628

(51) Int. Cl.⁷ ............................ B29C 47/02; B29C 59/04
(52) U.S. Cl. ............... 156/209; 156/244.16; 156/244.27; 156/280
(58) Field of Search .............................. 156/209, 244.16, 156/244.11, 244.27, 280, 324; 264/173.12, 173.16, 176.1, 177.17

(56) References Cited

U.S. PATENT DOCUMENTS

| | | | |
|---|---|---|---|
| 4,899,881 | * 2/1990 | Girard et al. | 206/457 |
| 4,997,364 | * 3/1991 | McGrath et al. | 432/59 |
| 5,122,212 | * 6/1992 | Ferguson et al. | 156/209 |
| 5,232,764 | * 8/1993 | Oshima | 428/173 |
| 5,356,705 | * 10/1994 | Kelch et al. | 428/332 |
| 5,492,705 | * 2/1996 | Porchia et al. | 426/106 |
| 5,833,792 | * 11/1998 | Funaki et al. | 156/244.27 |
| 5,928,762 | * 7/1999 | Aizawa et al. | 428/156 |

FOREIGN PATENT DOCUMENTS

| | | |
|---|---|---|
| 0 616 880 | 9/1994 | (EP) . |
| 0 767 210 | 4/1997 | (EP) . |
| 2 250 232 | 6/1992 | (GB) . |
| 8-1881 | 1/1996 | (JP) . |
| 8-34058 | 2/1996 | (JP) . |
| 8-90740 | 4/1996 | (JP) . |
| 8-132577 | 5/1996 | (JP) . |

OTHER PUBLICATIONS

Patent Abstracts of Japan vol. 096, No. 009 JP 08–132577, May 28, 1996 (1 page).

Patent Abstracts of Japan vol. 096, No. 006 JP 08–034058, Feb. 6, 1996(1 page).

* cited by examiner

Primary Examiner—Michael W. Ball
Assistant Examiner—Barbara J. Musser
(74) Attorney, Agent, or Firm—Flynn, Thiel, Boutell & Tanis, P.C.

(57) ABSTRACT

A method produces a decorative sheet with the use of an apparatus having a metallic endless belt that is wound on a first roller and a second roller, and an emboss roller that is placed to abut through the metallic endless belt onto the first roller. The method includes the steps of: adhering a first resin sheet having a pictured layer onto the metallic endless belt abutting the first roller; running the first resin sheet, adhered onto the metallic endless belt, along the outer circumferential face of the emboss roller; guiding a second resin sheet, moltenly extruded from a molten-resin extrusion means, between the emboss roller and the metallic endless belt abutted to the first roller; laminating and joining the second resin sheet to the first resin sheet; and embossing patterns onto the second resin sheet with the emboss roller during the laminating and joining step for the first and second resin sheets.

13 Claims, 3 Drawing Sheets

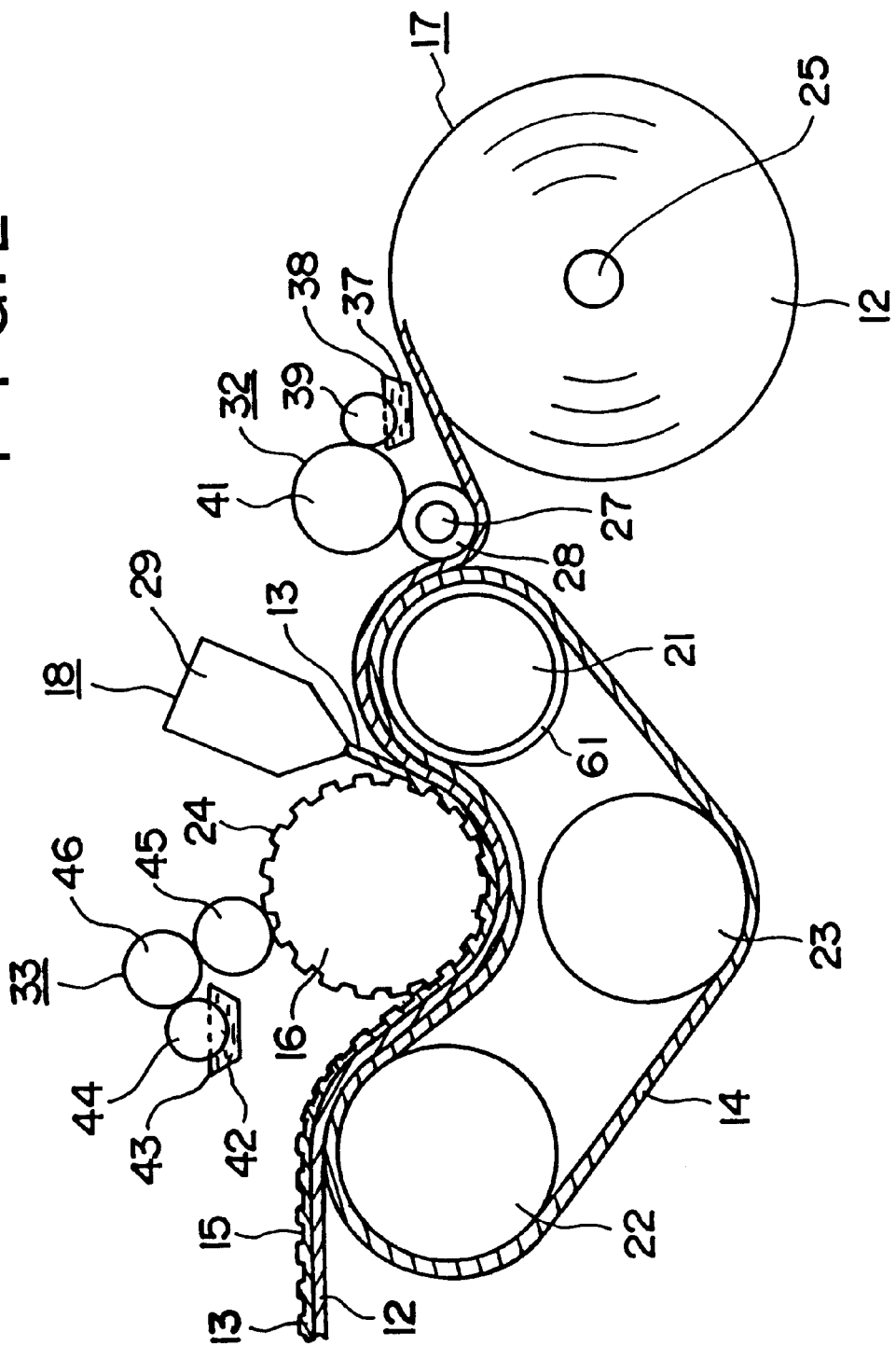
F I G. 2

METHOD FOR PRODUCING A DECORATIVE SHEET AND APPARATUS FOR PRODUCING THE SAME

BACKGROUND OF THE INVENTION

1. Field of the Invention

The present invention relates to a method and an apparatus for producing a decorative sheet that is laminated of a first resin sheet, having a pictured layer, and a second resin sheet having embossed patterns. The fabricated decorative sheet is used in production of a decorative board by being joined onto the surface of a wooden board, an inorganic board, metallic board or the like.

2. Description of the Related Art

As an outer surface material of a decorative board, a decorative sheet that, for example, is laminated of a first resin sheet having a woodgrain pictured layer and a second resin sheet having woodgrain emboss patterns is used. The decorative board having the decorative sheet provides a woody feeling caused by the woodgrain emboss patterns in addition to the woodgrain picture.

Conventionally, the decorative sheet is produced by the following steps: an emboss roller embosses patterns onto a sheet which is moltenly extruded from a molten-resin extrusion means, and then a sheet having the pictured layer is laminated on the underside of the embossed sheet.

As materials of the decorative sheet, instead of generally used polyvinyl chloride, the use of a polyolefin type resin (see Japanese Patent Laid-open No. Hei8-34058 and Japanese patent Laid-open No. Hei8-132577) or a resin containing polypropylene and a polyolefin type flexible component (see Japanese Patent Laid-open No. Hei8-1881) has been proposed from the viewpoint of safeguarding the environment from hydrogen chloride gas that is produced in an incinerating process.

The aforementioned resin avoids the environmental disruption, but, on the other hand, the sheet could expand and contract when the first and second resin sheets are mutually laminated according to the conventional method for producing the decorative sheet. Especially, if ink is coated on the embossed patterns of the resin sheet, the inconsistency between the positions of the embossed pattern and the picture on the sheet is more noticeable when the expanded or contracted sheets are mutually laminated, therefore the original design cannot be obtained on the decorative sheet.

SUMMARY OF THE INVENTION

A method for producing a decorative sheet according to the present invention, which uses an apparatus having a metallic endless belt that is wound on a first roller and a second roller, and an emboss roller that is placed to abut through the metallic endless belt to the first roller, is characterized by including the following steps of: adhering a first resin sheet having a pictured layer on the metallic endless belt abutting the first roller; running the first resin sheet, adhered onto the metallic endless belt, along the outer circumferential face of the emboss roller; guiding a second resin sheet, moltenly extruded from a molten-resin extrusion means, between the emboss roller and the metallic endless belt abutted to the first roller; and laminating the second resin sheet to the first resin sheet to join to each other and to emboss patterns onto the second resin sheet by using the emboss roller.

It is preferable that the surface of the metallic endless belt is a mirror face.

As the materials of the metallic endless belt, stainless steel, carbon steel, titanium alloy and so on can be used. The thickness of the endless belt is selective, and the desirable thickness is more than 3.0 mm for reason of strength.

The emboss roller has patterns on the outer circumferential face for forming the emboss patterns on the sheet. The specific configuration of the pattern is selective, for example, a reversed configuration of woodgrain pattern is selected when the woodgrain patterns are required to be formed on the second resin sheet.

It is preferable that the first resin sheet has opacifying properties, therefore it is desirable that the first resin sheet is appropriately colored with inorganic pigment. The pictured layer of the first resin sheet is formed by printing. The first and second resin sheets are joined through the pictured layer to each other, so that the pictured layer is needed to have appropriate adhering properties and heat resistance. When the adhering properties and heat resistance cannot be obtained sufficiently, the first and second resin sheet may be joined through the anchor coated layer to each other. The specific picture of the pictured layer is selective. For example, the picture is a woodgrain picture when the woodgrain decorative sheet is required.

Kind of resin for the first and second resin sheets is selective, but it is advisable to use a polyolefin type resin from the viewpoint of the environment. The polyolefin type resin includes polyethylene (such as HDPE, LDPE, L-LDPE), polypropylene (homo-, random-), a polyolefin type thermoplastic elastomer (such as TPO) and so on.

It should be mentioned that a denatured polyolefin type resin having sufficient adhering properties may be laminated on the surface of the second resin sheet, which is joined with the first resin sheet, by means of co-extrusion in order to improve the adhering strength to the first resin sheet.

The aforementioned sheet includes a relatively thin film.

The aforementioned molten-resin extrusion means is, for example, a die of an extruder.

According to the present invention, the first resin sheet that is to be joined with the second resin sheet is adhered onto the metallic endless belt, so that the first resin sheet avoid expanding and contracting and can be joined with the second resin sheet. Therefore, the positions of the pictured layer and the embossed patterns can be accurately agreed with each other (harmonization) so as to reproduce the original decorative design.

In the producing method of the present invention, the embossed patterns on the second resin sheet, formed in the aforementioned embossing step, may be coated with ink.

The embossed patterns are decorated by being coated with the ink in impressions of the embossed patterns. Where the ornamentation is presented by coating the ink, the accuracy of the positioning of the pictured layer of the first resin sheet and the embossed patterns of the second resin sheet, which is created by the producing method of the present invention, is exploited clearer.

Note that the ink can be coated on the embossed patterns of the second resin sheet while the embossed patterns are being formed or after.

The method for producing the decorative sheet according to the present invention may include the following steps of, with the use of a device having an anchor coating means for anchor-coating on the pictured layer, an ink coating means provided to be ganged with the emboss roller, and a top coating means for top-coating on the second resin sheet laminated to the first resin sheet: forming an anchor coated layer on the first resin sheet before the second resin sheet is laminated to the first resin sheet; forming an inked layer on the second resin sheet while the emboss roller is embossing the patterns; and forming a top coated layer on the second resin sheet laminated to the first resin sheet.

The inked layer is formed on the embossed patterns while the patterns are being embossed onto the second resin film by using the emboss roller, thereby effectively forming the inked layer.

The aforementioned anchor coated layer allows the first and second resin sheets to have enhanced adhering properties.

The inked layer allows the embossed patterns to be decorated.

The top coated layer effects the improved durability of the decorative sheet.

In the method for producing the decorative sheet according to the present invention, it is advisable that the first roller is covered on the surface with an elastic member.

The elastic member is advisably formed as at least an outer face layer on the first roller. The preferable hardness (adherence to JIS K6301 A-type) of the elastic member is less than 95 degrees.

As materials of the elastic member, fluorine type rubber, silicone type rubber, urethane rubber, neoprene rubber, EPDM, and so on can be used. In order to improve heat-transfer properties, the elastic member can contain a metallic powder (e.g., iron powder, copper powder). The preferable thickness of the elastic member is more than 3 mm in order to obtain an appropriate area pressure through the elastic deformation.

According to the present invention, an area-touching condition when the first roller and the emboss roller touch the resin sheet is obtained, so that even the thin decorative sheet can be sufficiently printed without irregular printing.

Additionally, friction between the endless belt and the first roller is reduced, so that wear of the first roller can be prevented.

An apparatus for producing a decorative sheet according to the present invention is characterized by including: a metallic endless belt wound on a first roller and a second roller; an emboss roller placed to abut through the metallic endless belt to the first roller; a first resin sheet supplying means for supplying a first resin sheet, having a pictured layer, to adhere the first resin sheet onto the metallic endless belt abutted to the first roller; and a second resin sheet molten-resin extrusion means for guiding a molten second resin sheet between the emboss roller and the metallic endless belt abutted to the first roller.

The invention is an apparatus for carrying out the aforementioned method for producing the decorative sheet.

The specific conditions of the metallic endless belt, the emboss roller and so on are as described in the description concerning the method for producing the decorative sheet.

Inside the metallic endless belt, at least the first and second roller should be placed, but, for example, a third roller can additionally be placed for controlling tension.

The producing apparatus of the present invention can include an ink coating means for coating ink on embossed patterns on the second resin sheet which is formed by using the emboss roller.

The producing apparatus of the present invention can include: an anchor coating means for anchor-coating on the pictured layer; an ink coating means provided to be ganged with the emboss roller; and a top coating means for top-coating on the second resin sheet laminated to the first resin sheet.

In order to gang the emboss roller with the ink coating means, an appropriate roller as an ink transfer can be placed between the emboss roller and the ink coating means so as to supply ink from the ink coating means to the emboss roller.

The ink coating means effect to form the inked layer on the embossed patterns while the emboss roller is embossing the patterns on the second resin sheet.

Furthermore, in the apparatus for producing the decorative sheet according to the present invention, it is advisable that the first roller is covered on the surface with an elastic member.

BRIEF DESCRIPTION OF THE DRAWINGS

FIG. 2 is a fragmentary enlarged view of the producing apparatus of the preferred embodiment.

DETAILED DESCRIPTION OF THE PREFERRED EMBODIMENT(S)

A producing method and an apparatus of a decorative sheet according to the preferred embodiment of the present invention will be described hereinafter with reference to FIG. 1 to FIG. 3.

Figure 1:
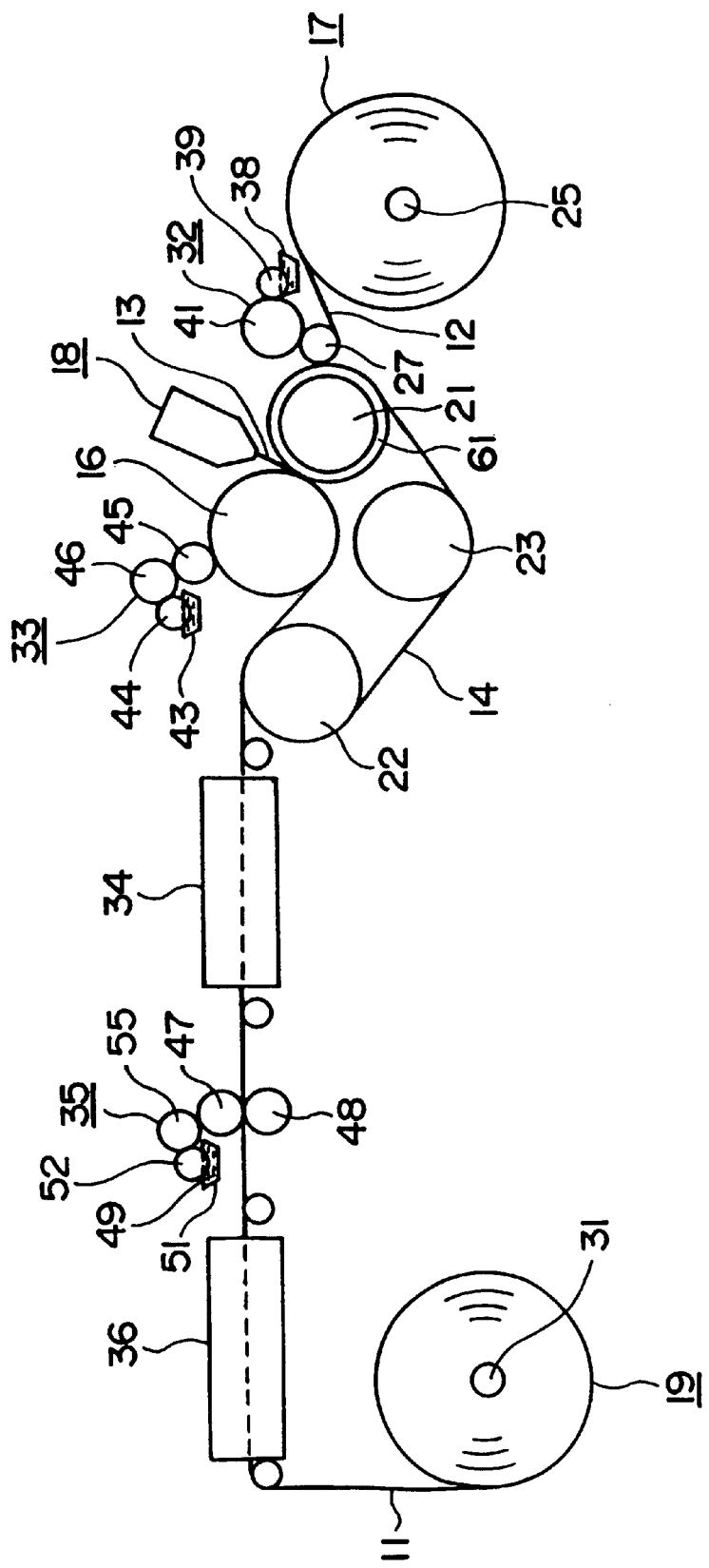
FIG. 1 is a diagrammatic view of a producing apparatus of a decorative sheet in the preferred embodiment according to the present invention.

As shown in FIG. 1 and FIG. 2, the producing apparatus of the decorative sheet 11 according to the embodiment is composed of: a metallic endless belt 14 adhered with a first resin sheet 12; an emboss roller 16 for forming an embossed pattern 15 onto a second resin sheet 13; a first resin sheet supplying means 17 for supplying the first resin sheet 12; a second resin sheet molten-resin extrusion means 18 for supplying the molten second resin sheet 13; and a rewinding means 19 for the decorative sheet.

The metallic endless belt 14 is wound onto a first roller 21, a second roller 22 and a third roller 23. The endless belt 14 has a mirror finished surface.

The first roller 21 is located at the feeding side of the first resin sheet 12 in respect to the endless belt 14. The first roller 21 is covered on the surface with an elastic member 61 and has therein a temperature controlling means for heating the endless belt 14.

The second roller 22 is located at a position where the laminated first and second resin sheets 12 and 13 are peeled from the endless belt 14. The second roller 22 has therein a cooling means, such as a water-cooling system, for cooling the sheets.

The third roller 23 is located to form a triangle with the first and second rollers 21 and 22 in order to control tension of the endless belt 14. The third roller 23 has therein a temperature controlling means for heating the endless belt 14.

At least one of the first and second rollers 21 and 22 is coupled to a rotary driving means, such as a motor.

The emboss roller 16 is located to abut the first roller 21 through the endless belt 14 and to press the endless belt 14 downward between the first roller 21 and the second roller 22. In other words, the emboss roller 16 is located to appear to be wound with the endless belt 14 on the under half part of the outer circumferential face of the emboss roller 16.

Patterns 24 of the emboss roller 16 has the reversed configuration in correspondence with the woodgrain embossed pattern 15 which is formed on the second resin sheet 13.

The first resin sheet supplying means 17 is a sending roller 25 wound with the first resin sheet 12. The first resin sheet 12 is colored and formed with a pictured layer 26 on the face which is not abutted to the endless belt 14 (see FIG. 3). The pictured layer 26 is formed by using a woodgrain printing pattern.

An elastic roller 27 is placed opposite the endless belt 14 to abut the first roller 21 through the endless belt 14. An elastic member 28, such as silicone rubber, is adhered on the outer circumferential surface of the elastic roller 27. The elastic roller 27 is formed in order to adhere the first resin sheet 12 onto the metallic endless belt 14 abutted to the first roller 21.

The second resin sheet molten-resin extrusion means 18 for the second resin sheet 13 is a die 29 of an extruder (not shown). The die 29 is located at a position where the second resin sheet 13 extruded from the die 29 can be supplied onto the emboss roller 16 in the molten state.

The rewinding means 19 for the decorative sheet 11 has a rewinding roller 31 for winding the fabricated decorative sheet 11.

The above producing apparatus further includes an anchor coating means 32, an ink supplying means 33, a first dryer 34, a top coating means 35, and a second dryer 36.

The anchor coating means 32, in turn, is composed of a tank 38 for stocking an anchor coat fluid 37; a first coating roller 39 which is placed at a position where a part of the first coating roller 39 is partially soaked in the anchor coat fluid 37; and a second coating roller 41 which is placed to be abutted to and ganged with the first coating roller 39 and the elastic roller 27. As the anchor coat fluid 37, for example, a double-fluid blending oily urethane type resin, a double-fluid blending oily polyester type resin, a double-fluid blending water-base acrylic-emulsion type resin, or the like is used.

The ink supplying means 33 is provided for printing the woodgrain picture, and composed of: a tank 43 for stocking an ink 42; a first coating roller 44 which is placed at a position where a part of the first coating roller 44 is partially soaked in the ink 42; a roll coater 45 which is abutted to and ganged with the emboss roller 16; and a second coating roller 46 which is placed between the first coating roller 44 and the roll coater 45. As the ink 42, for example, an urethane type ink is used.

The first dryer 34 is located at a position where the first and second resin sheets 12 and 13 are peeled from the endless belt 14 and immediately guided to the first dryer 34. A heating device, such as an infrared heater, is provided in the first dryer 34.

The top coating means 35 is placed downstream from the first dryer 34 in the flow of the first and second resin sheets 12 and 13. The top coating means 35 is composed of: a roll coater 47 which is placed to abut the upper face of the second resin sheet 13; a tank 51 stocking a top coat fluid 49; a first coating roller 52 which is placed at a position where a part of the first coating roller 52 is partially soaked in the top coat fluid 49; and a second coating roller 55 which is placed to be abutted to and ganged with the first coating roller 52 and the roll coater 47. And furthermore, a guiding roller 48 is located beneath the first resin sheet 12 to be opposite the roll coater 47. As the top coat fluid 49, for example, urethane type resin is used.

The second dryer 36 is placed downstream from the top coating means 35 in the flow of the first and second resin sheets 12 and 13. A heating device, such as an infrared heater, is provided in the second dryer 36.

The decorative sheet 11 according to the embodiment is fabricated with the producing apparatus described thus far by the following steps.

First, the first resin sheet 12 supplied from the first resin sheet supplying means 17 is adhered onto the endless belt 14 that is abutted to the first roller 21 by using the elastic roller 27. The endless belt 14 is already heated at a specified temperature by the first and third rollers 21 and 23. At the same time the first resin sheet 12 is adhered onto the endless belt 14, an anchor coat layer 40 is formed on the pictured layer 26 by coating the anchor coat fluid 37 from the anchor coating means 32 through the elastic roller 27.

Next, the first resin sheet 12 adhered onto the endless belt 14 is delivered to the emboss roller 16 by running with the rotation of the endless belt 14. Here, the molten second resin sheet 13 supplied from the die 29 is guided between the emboss roller 16 and the first resin sheet 12 which is abutted through the endless belt 14 onto the first roller 21 and is jointed onto the first resin sheet 12. When the first resin sheet 12 is laminated to the second resin sheet 13, the patterns are embossed onto the second resin sheet 13 by using the emboss roller 16 and an inked layer 53 is formed on an impression 15A of the embossed pattern 15 by coating the ink 42 on the second resin sheet 13 by using the ink supplying means 33 while the patterns are being embossed (see FIG. 3).

The laminated first and second resin sheets 12 and 13 are run along the outer circumferential surface of the emboss roller 16 while being adhered onto the endless belt 14, and delivered to the second roller 22. Here, the laminated first and second resin sheets 12 and 13 are cooled by using the second roller 22, after that, are peeled from the endless belt 14 and delivered into the first dryer 34 in which the ink on the inked layer 53 is dried. After that, continuously, the sheets are moved to the top coating means 35, in which a top coated layer 54 is formed by coating the top coat fluid 49 on the surface of the second resin sheet 13.

The flow of the laminated resin sheets 12 and 13 is moved into the second dryer 36, in which the top coat fluid 49 is dried. And then the fabricated decorative sheet 11 is wound on the rewinding roller 31.

Figure 3:
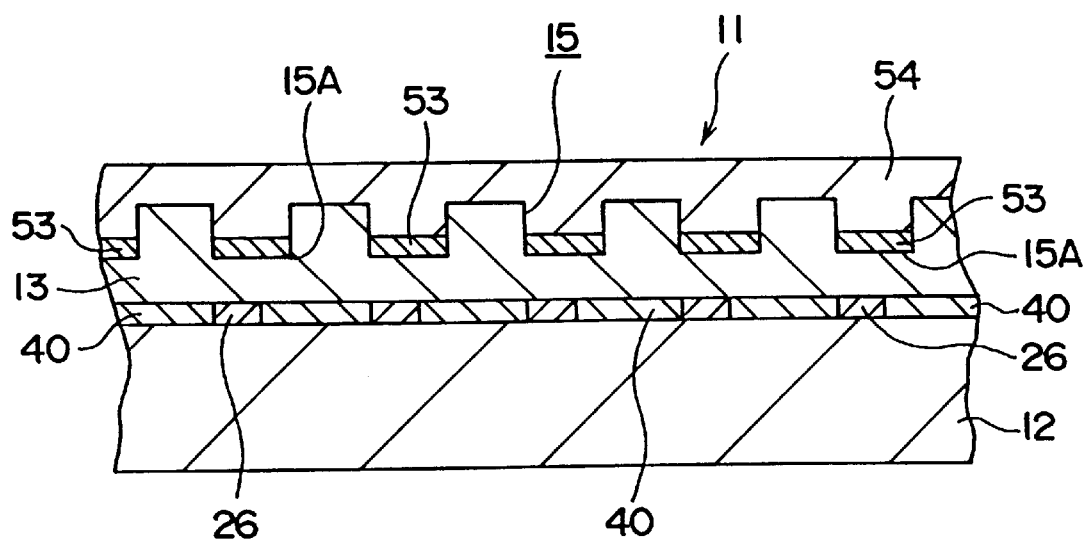
FIG. 3 is a sectional view of the decorative sheet obtained through a producing method according to the preferred embodiment.

As shown in FIG. 3, the decorative sheet 11 fabricated through the embodiment has: the first resin sheet 12; the pictured layer 26 and the anchor coated layer 40 which are formed on the first resin sheet 12; the second resin sheet 13 which is formed on the pictured layer 26 and the anchor coated layer 40; and the top coated layer 54 which is formed on the second resin sheet 13. The embossed pattern 15 is formed on the second resin sheet 13 which has the inked layer 53 in the impression 15A of the embossed pattern 15.

According to the embodiment described thus far, the first resin sheet 12 which is to be joined with the second resin sheet 13 is adhered onto the metallic endless belt 14, so that the first resin sheet 12 avoids expanding and contracting and can be joined with the second resin sheet 13. Each speed for supplying the first and second resin sheets 12 and 13, the tension of the resin sheets, the hardness of the elastic member 28 of the elastic roller 27, the temperature of the elastic roller 27 and so on are defined in advance to obtain the agreement between the positions of the pictured layer 26 of the first resin sheet 12 and the embossed pattern 15 of the second resin sheet 13 as shown in the original decorative design. Thereby the positions of the pictured layer 26 and the embossed pattern 15 can be accurately agreed with each other (harmonization) so as to reproduce the original decorative design.

In the embodiment, the ornamentation is presented by coating the ink 42 in the impressions 15A of the embossed patterns 15, so that the accuracy of the positioning of the pictured layer 26 of the first resin sheet 12 and the embossed pattern 15 of the second resin sheet 13 is exploited clearer.

The ink coating means 33 forms the inked layer 53 in the impression 15A of the embossed pattern 15 while the patterns are being embossed onto the second resin film 13 by the emboss roller 16, thereby effectively forming the inked layer 53.

When the emboss roller 16 embosses the patterns on the second resin sheet 13, the second resin sheet 13 is pressured toward the emboss roller 16 by the endless belt 14, thereby enhancing the reproducibility of embossing the patterns.

The endless belt 14 has a mirror finished surface. Therefore, the second resin sheet 13 is adhered onto the endless belt 14 with the first resin sheet 12. Nevertheless, the laminated resin sheets 12 and 13 can be smoothly peeled from the endless belt 14.

Moreover, the surface of the first roller 21 is covered with the elastic member 61, so that even the thin decorative sheet 11 can be sufficiently printed heedless irregular printing.

Experiment

In the above embodiment, the decorative sheet is made in the following specified conditions of the producing apparatus and the producing method.

The first resin sheet: HDPE; 75%, talc; 20%, titanium oxide; 5%, thickness; 100 $\mu$m The second resin sheet: TPO (trade name; Idemistu TPO E-2900 made by IDEMITSU PETROCHEMICAL CO., LTD.)

Temperature of the die: 305° C.

The metallic endless belt: stainless steel

The elastic member of the first roller:
silicone rubber (thickness: 10 mm, hardness: 60 degrees)

Temperature of the emboss roller:
40° C.

The anchor coat fluid: a double-fluid blending oily urethane type resin

The ink: an urethane type ink

The top coat fluid: an urethane type resin

On the decorative sheet 11 obtained in the experiment, the pictured layer 26 of the first resin sheet 12 and the embossed pattern 15 of the second resin sheet 13 are accurately placed in relation to each other as shown in the original decorative design. Slide between the positions of the pictured layer 26 and the embossed pattern 15 which is caused by the expanded and contracted second resin sheet 13, is not shown.

The laminated strength of the decorative sheet 11 is measured as 20N/25 mm (60° C.), so that it is understood that the adhering strength between the first resin sheet 12 and the second resin sheet 13 is sufficient.

Furthermore, the decorative sheet 11 obtained in the experiment has the anchor coated layer 40, thereby being outstanding in durability, heat resistance and chemical resistance.

What is claimed is:

1. A method for producing a decorative sheet with the use of an apparatus having a metallic endless belt that is wound on a first heated roller and a second roller, and an emboss roller that is placed to abut through the metallic endless belt to the first heated roller, said method comprising the steps of:

heating the metallic endless belt with the first heated roller;

adhering a first resin sheet having a pictured layer on the metallic endless belt abutting the first roller to avoid expansion and contraction thereof;

advancing the first resin sheet in a molten state, adhered onto the metallic endless belt, along the outer circumferential face of the emboss roller;

guiding a second molten resin sheet, moltenly extruded from a molten-resin extrusion means, between the emboss roller and the metallic endless belt abutting the first heated roller; and laminating the second resin sheet to the first resin sheet to join the resin sheets and embossing patterns onto the second resin sheet by using the emboss roller and the metallic endless belt abutting the first heated roller.

2. The method for producing the decorative sheet according to claim 1, wherein the embossed patterns on the second resin sheet, formed in said embossing step, are coated with ink.

3. A method for producing a decorative sheet with the use of an apparatus having a metallic endless belt that is wound on a first heating roller and a second cooling roller, and an emboss roller that is placed to abut through the metallic endless belt to the first heating roller and, with the use of a device having an anchor coating means for anchor-coating on the pictured layer, an ink coating means provided to be ganged with the emboss roller, and a top coating means for top-coating on the second resin sheet laminated to the first resin sheet, said method comprising the steps of:

heating the metallic endless belt;

adhering an underlying side of the first resin sheet having a second pictured layer side on the metallic endless belt abutting the first heating roller;

advancing the first resin sheet adhered onto the metallic endless belt, along the outer circumferential face of the first heating roller;

guiding a second molten resin sheet, moltenly extruded from a molten-resin extrusion means, between the emboss roller and the metallic endless belt abutting the first roller;

forming an anchor coated layer on the first resin sheet;

laminating the second resin sheet to the first resin sheet at the pictured layer side to join the resin sheets and to emboss patterns onto the second resin sheet by using the emboss roller and the metallic endless belt;

forming an inked layer on the second resin sheet while the emboss roller is embossing the patterns; and forming a top coated layer on the second resin sheet laminated to the first resin sheet.

4. The method for producing the decorative sheet according to claim 1, wherein the first resin sheet and the second resin sheet are a polyolefin type resin.

5. The method for producing the decorative sheet according to claim 4, wherein the polyolefin type resin is selected from polyethylene, polypropylene, and a polyolefin type thermoplastic elastomer.

6. A method for producing a decorative sheet with the use of an apparatus having a metallic endless belt that is wound on a first roller and second roller, and an emboss roller that is placed to abut through the metallic endless belt to the first roller, and said method comprising the steps of:

heating the metallic endless belt;

adhering a first resin sheet on the heated metallic endless belt abutting the first roller;

advancing the first resin sheet, onto the metallic endless belt, along an outer circumferential face of the emboss roller;

guiding a second molten resin sheet between the emboss roller and the metallic endless belt abutting the first roller; and laminating the second resin sheet to the first resin sheet to join the resin sheets while embossing patterns onto the second resin sheet by using the emboss roller and while forming an ink layer on the second resin sheet using the emboss roller.

7. The method for producing the decorative sheet according to claim 6, further comprising the step of forming a top coated layer on the second resin sheet laminated to the first resin sheet.

8. The method for producing the decorative sheet according to claim 1, including the step of cooling the metallic endless belt with a water-cooling system.

9. The method for producing the decorative sheet according to claim 6, including the step of cooling the metallic endless belt with a water-cooling system and wherein the circumference of the first roller is covered with an elastic member.

10. A method for producing a decorative sheet with the use of an apparatus having a metallic endless belt that is wound on a first heating roller with an elastic surface layer about a circumference thereof, the metallic endless belt also being wound about a second cooling roller returning the belt to the first heating roller, an emboss roller that is positioned to apply force to the first heating roller through the metallic endless belt, said method comprising the steps of:

supplying a first resin sheet from a supply roll, the first resin sheet having a pictured layer on a first side thereof and a second underlying side;

applying an anchor coating from a coating roller onto an elastic coating roller;

heating the metallic endless belt to a selected temperature, the first heating roller including a temperature controller for controlling heating of the metallic endless belt;

adhering the underlying side of the first resin sheet onto the metallic endless belt abutting the first heating roller at a nip formed between the first heating roller and the elastic coating roller to prevent expansion or contraction of the first resin sheet during further processing thereof, the adhering caused by the controlling of the heating of the first heating roller;

applying the anchor coating from the elastic coating roller onto the pictured layer side of the first resin sheet;

advancing the first resin sheet on the metallic endless belt about the first heated roller;

applying ink to the embossing roller;

guiding a second molten extruded resin sheet from a molten-resin extrusion means between the emboss roller and the metallic endless belt which abuts and advances on the first heating roller thereat;

laminating the second resin sheet to the first resin sheet to join the resin sheets and to simultaneously emboss inked patterns onto an embossed and inked side of the second resin sheet in a nip defined by the emboss roller and the first heating roller to form a laminated resin sheet, the second resin sheet having a second securing side joined to the picture layer side of the first sheet, so that the laminated sheet has an inked and embossed side and an unembossed side adhered to the metallic endless belt;

advancing the metallic endless belt and the embossed laminated sheet adhered thereon away from the emboss roller;

cooling the metallic endless belt at the unembossed side of the laminated sheet with the cooling roller transporting the metallic endless belt;

separating the unembossed side of the laminated sheet from the metallic endless belt at the cooling roller;

drying the embossed laminated sheet;

applying a top coating layer to the embossed side of the laminated sheet to cover embossed indentations in the laminated sheet; and drying the coated embossed laminated sheet to form the decorative sheet.

11. The method of claim 10, including the step of, after the metallic endless belt rotates outwardly from the cooling roller, rotating the metallic endless belt about a second heating roller and advancing the metallic endless belt to the first heating roller, wherein the first heating roller assists in applying the anchor coating to the first resin sheet, adhering the first resin sheet to the metallic endless belt, providing an inked layer and embossing the second resin sheet while laminating the first and second resin sheets to form the embossed laminated sheet.

12. The method of claim 10, including the steps of:

controlling speed of the supply roll supplying the first resin sheet and controlling velocity of the second molten extruded resin sheet; and selecting the hardness and temperature of the first heating roller, wherein agreement between positions of the pictured layer on the first resin sheet and the embossed pattern of the second resin sheet is obtained to provide the decorative sheet.

13. The method of claim 12, including the step of heating the embossing roller to about 40 degrees centigrade.

* * * * *